US009493036B2

(12) United States Patent
Chung et al.

(10) Patent No.: US 9,493,036 B2
(45) Date of Patent: *Nov. 15, 2016

(54) FILM FOR A TIRE INNER LINER AND PREPARATION METHOD THEREFOR

(71) Applicant: Kolon Industries, Inc., Gwacheon-si (KR)

(72) Inventors: Il Chung, Daegu (KR); Gi-Woong Kim, Daegu (KR); Sang-Mok Lee, Gumi-si (KR); Ok-Hwa Jeon, Gyeongsan-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 695 days.

This patent is subject to a terminal disclaimer.

(21) Appl. No.: 13/803,637

(22) Filed: Mar. 14, 2013

(65) Prior Publication Data

US 2013/0199686 A1 Aug. 8, 2013

Related U.S. Application Data

(63) Continuation-in-part of application No. PCT/KR2012/005189, filed on Jun. 29, 2012.

(30) Foreign Application Priority Data

Jun. 30, 2011 (KR) ........................ 10-2011-0064936
Jun. 29, 2012 (KR) ........................ 10-2012-0070632

(51) Int. Cl.
| | |
|---|---|
| B32B 27/08 | (2006.01) |
| B32B 27/34 | (2006.01) |
| B32B 27/42 | (2006.01) |
| B32B 37/04 | (2006.01) |
| B29D 30/06 | (2006.01) |
| B60C 1/00 | (2006.01) |
| C08J 7/04 | (2006.01) |
| B32B 1/00 | (2006.01) |
| B32B 7/12 | (2006.01) |
| B32B 27/28 | (2006.01) |
| C08L 77/00 | (2006.01) |
| C09J 7/02 | (2006.01) |
| C09J 161/12 | (2006.01) |
| C08K 5/13 | (2006.01) |

(52) U.S. Cl.
CPC ......... B60C 1/0008 (2013.04); B29D 30/0681 (2013.01); B32B 1/00 (2013.01); B32B 7/12 (2013.01); B32B 27/08 (2013.01); B32B 27/285 (2013.01); B32B 27/34 (2013.01); C08J 7/047 (2013.01); C08L 77/00 (2013.01); C09J 7/0282 (2013.01); C09J 161/12 (2013.01); B29D 2030/0682 (2013.01); B32B 27/42 (2013.01); B32B 2307/54 (2013.01); B32B 2307/718 (2013.01); B32B 2605/00 (2013.01); B60C 2005/145 (2013.04); C08J 2371/02 (2013.01); C08J 2377/00 (2013.01); C08J 2377/02 (2013.01); C08J 2461/12 (2013.01); C08K 5/13 (2013.01); C08K 2201/008 (2013.01); C09J 2461/00 (2013.01); C09J 2471/006 (2013.01); C09J 2477/006 (2013.01)

(58) Field of Classification Search
None
See application file for complete search history.

(56) References Cited

U.S. PATENT DOCUMENTS

| | | | |
|---|---|---|---|
| 2011/0056612 | A1 | 3/2011 | Sugimoto |
| 2011/0060082 | A1 | 3/2011 | Sugimoto |

FOREIGN PATENT DOCUMENTS

| | | | |
|---|---|---|---|
| CN | 1976818 | 6/2007 | |
| CN | 101981120 | 2/2011 | |
| GB | 2030525 | 4/1980 | |
| JP | 07-149108 | 6/1995 | |
| JP | 08-132553 | 5/1996 | |
| JP | 09-165469 | 6/1997 | |
| JP | 10-044251 | 2/1998 | |
| JP | 2002-544357 | 12/2002 | |
| JP | 2005-219565 | 8/2005 | |
| JP | 2008-049749 | 3/2008 | |
| JP | 2009-165469 | 7/2009 | |
| JP | 2010-013617 | 1/2010 | |
| JP | 4435253 | 1/2010 | |
| KR | 10-2005-0122461 | 12/2005 | |
| KR | 1020060000035 | 1/2006 | |
| KR | 10-0705782 | 4/2007 | |
| KR | 1020110001651 | 1/2011 | |
| KR | 1020120002496 A | * 1/2012 | ............... C09J 7/02 |

OTHER PUBLICATIONS

Machine translation of KR 10-2012-0002496, Jan. 2012.*
International Search Report of Application No. PCT/KR2012/005189 (Jan. 31, 2013).
The EP Search Report, European Patent Office, May 18, 2015, Application No. 12803893.2.

* cited by examiner

Primary Examiner — Ramsey Zacharia
(74) Attorney, Agent, or Firm — Lex IP Meister, PLLC

(57) ABSTRACT

The present invention relates to a film for a tire inner liner, particularly to a film for a tire inner liner including: a base film including a copolymer or a mixture of polyamide-based resin and a polyether-based resin; and an adhesive layer including a resorcinol-formalin-latex (RFL)-based adhesive, wherein the base film has a tensile recovery rate of 30% to 80%. The film for a tire inner liner of the present invention may exhibit an excellent gas barrier property with a thin thickness, and thus enables light weight of a tire and improvement in automobile mileage, and enables easier forming during a tire manufacturing process.

9 Claims, 1 Drawing Sheet

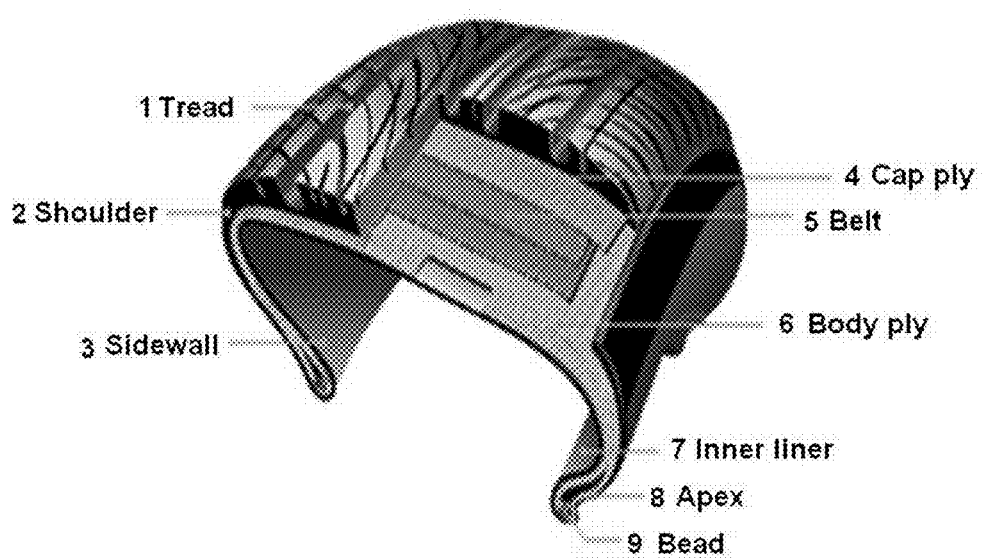
- PRIOR ART -

# FILM FOR A TIRE INNER LINER AND PREPARATION METHOD THEREFOR

CROSS-REFERENCES TO RELATED APPLICATION

This application is a continuation-in-part application of PCT/KR2012/005189 filed on Jun. 29, 2012, which claims priority to Korean Patent Application No. 10-2011-0064936 filed on Jun. 30, 2011 and Korean Patent Application No. 10-2012-0070632 filed on Jun. 29, 2012, the contents of which are incorporated herein by reference.

FIELD OF THE INVENTION

A film for a tire inner liner and a method of preparing thereof are provided.

In certain embodiments, a film for a tire inner liner has a thin thickness such that it exhibits superior gas-barrier properties with a lighter weight, and thus improves fuel efficiency, allows higher formability during its preparation, has excellent mechanical properties including high durability and fatigue resistance, and provides excellent adhesive strength to a tire carcass layer.

BACKGROUND OF THE INVENTION

A tire is designed to withstand the weight of an automobile, reduce impact force exerted by the road, and transfer driving force or braking force of an automobile to the ground. In general, a tire is a complex of fiber/steel/rubber, and has a structure as shown in FIG. 1.

Tread (1) is a part contacting the road. It should afford frictional forces required for driving/braking, have superior wear and heat resistance, and withstand external impact force.

Body ply, or carcass (6) is a cord layer inside the tire. It should be able to support the weight of an automobile, withstand impact force, and have high resistance to fatigue caused by bending and stretching during automobile operation.

Belt (5), mainly made up of a steel wire, is located between the body plies, adapted to reduce external impact force and maintains a wide contact area of the tread for vehicle running stability.

Side wall (3) is a rubber layer between a part below a shoulder (2) and bead (9). It protects the body ply (6).

Inner liner (7), in replacement of a tube, is located inside the tire, and allows a pneumatic tire by preventing air leakage.

Bead (9), a square or hexagonal wire bundle formed of rubber-coated steel wires, serves to position and fix the tire in a rim.

Cap ply (4) is a special cord located on a radial tire belt, and minimizes the belt movement during operation of an automobile.

Apex (8) is a triangular rubber filler designed to minimize the bead displacements, protect the beads by alleviating external impact force, and prevent air inflow during the tire construction.

Recently, a tubeless tire injected with a high air pressure of 30 to 40 psi has been commonly used. In such tire, an inner liner having high gas barrier properties is positioned on the inner layer of the carcass to prevent air leakage during automobile operation.

Moreover, as a main ingredient, a tire inner liner including a rubber such as butyl rubber or halobutyl rubber and the like having relatively low air permeability has been previously used. In order to achieve sufficient gas barrier properties for such inner liner, however, an increase in the amount of the rubber content or in the thickness of the inner liner thickness has been required. As a result, the total weight of the tire was increased, thereby decreasing fuel efficiency. In addition, during tire vulcanization or vehicle operation, air pockets were generated between the inner rubber of the carcass layer and the inner liner, or the deformation or deviation of the shapes or properties of the inner liner have been observed.

Accordingly, there is a demand for studies on a film for a tire inner liner that may achieve light weight of a tire with a thinner thickness, and simultaneously exhibit excellent properties including gas barrier property, formability, and the like.

SUMMARY OF THE INVENTION

Disclosed herein is a film for a tire inner liner and a method for preparing the film for a tire inner liner. The tire inner liner may exhibit an excellent gas barrier property with a thin thickness, and thus enables light weight of a tire and an improvement in automobile mileage, enables easier forming during a tire manufacturing process, and has excellent mechanical properties including high durability, high fatigue resistance, excellent formability, and the like.

An exemplary embodiment provides a film for a tire inner liner including: a base film layer including a copolymer including a polyamide-based segment and a polyether-based segment, and a polyamide-based resin; and an adhesive layer formed on at least one side of the base film layer and including a resorcinol-formalin-latex (RFL)-based adhesive, wherein the tensile recovery rate of the base film layer is 30% to 80%.

Another embodiment provides a method for manufacturing the film for a tire inner liner, including: mixing a copolymer including a polyamide-based segment and a polyether-based segment, and a polyamide-based resin, and melting and extruding the mixture at 230 to 300° C. to form a base film layer; and forming an adhesive layer including a resorcinol-formalin-latex (RFL)-based adhesive on at least one side of the base film layer.

Hereinafter, further embodiments will be described in detail.

BRIEF DESCRIPTION OF THE DRAWINGS

The exemplary embodiments will be more clearly understood from the following detailed description taken in conjunction with the accompanying drawings, where:

FIG. 1 schematically shows the structure of a pneumatic tire.

DETAILED DESCRIPTION OF THE INVENTION

The present invention will be described more fully hereinafter in the following detailed description of the invention, in which some but not all embodiments of the invention are described. This invention may be embodied in many different forms and should not be construed as limited to the embodiments set forth herein; rather, these embodiments are provided so that this disclosure will satisfy applicable legal requirements.

According to one embodiment of the invention, there is provided a film for a tire inner liner including: a base film layer including a copolymer including a polyamide-based segment and a polyether-based segment, and a polyamide-based resin; and an adhesive layer formed on at least one side of the base film layer and including a resorcinol-formalin-latex (RFL)-based adhesive, wherein the tensile recovery rate of the base film layer according to the following Formula 1 is about 30% to about 80%.

$$\text{Tensile Recovery}(\%)=(L_1-L_2)*100/(L_1-L_0) \quad \text{[Formula 1]}$$

In Formula 1, $L_1$ denotes the length of the base film at 100% elongation at room temperature, $L_2$ denotes the final length of the base film when the base film is shrunken after 100% elongation at room temperature, and $L_0$ denotes the length of the original sample before elongation.

As results of studies, the inventors confirmed that if a base film layer formed using a copolymer including the polyamide-based segment and the polyether-based segment and a polyamide-based resin is used, an excellent gas barrier property may be achieved with a thin thickness, thus enabling light weight of a tire and improvement in automobile mileage, and thus a film for a tire inner liner that has excellent mechanical properties including high durability and fatigue resistance and excellent formability while having high heat resistance may be provided.

Particularly, the base film layer of the tire inner liner may have a tensile recovery rate of about 30% to about 80%, preferably about 38% to about 64%, as defined by Formula 1, and thereby the film for a tire inner liner may exhibit an a elasticity behavior or shape recovery property similar to other tire constituting parts including rubber ingredients, for example, the carcass.

In general, a polymer resin film used as a film for a tire inner liner has viscoelasticity or has a low elasticity recovery property. However, the base film layer has a specific tensile recovery rate as explained above, thus exhibiting excellent elasticity behavior or shape recovery property, and thereby, it has high durability and excellent shape stability to deformations during automobile running, and may minimize problems caused by an elasticity behavior difference from other constituting parts such as the carcass, for example, wrinkles or cracks on the film or deterioration of properties or adhesion, and the like.

Specifically, if the base film layer has a tensile recovery rate defined by the Formula 1 of about 30% or more, sufficient elasticity recovery may be secured to deformation or elongation during a tire forming process or automobile running, and thus the film for a tire inner liner may have excellent shape stability and durability, wrinkle generation due to a deformation difference from vulcanized rubber may be prevented, thus preventing delamination between the inner liner film and rubber, and deterioration of inner liner film properties or shape or external damage may be prevented, thus securing a high gas barrier property even if used for a long period.

If the base film layer has a tensile recovery rate defined by Formula 1 of less than about 80%, sufficient mechanical properties required for an inner liner film may be achieved, stress concentration on the inner liner film due to deformation during tire running may be prevented, and deterioration of film uniformity or film formability caused by excessively high elasticity or elasticity recovery during a film manufacturing process or automobile running may be prevented.

Specifically, the above-explained properties of the film for a tire inner liner result from the application of the base film layer manufactured using a copolymer including the polyether-based segment and the polyamide-based segment together with the polyamide-based resin.

More specifically, since the base film layer uses a copolymer including the polyether-based segment that afford an elastomeric property to a polyamide-based resin, it may simultaneously have an excellent gas barrier property and a relatively low modulus. The polyamide-based resin included in the base film layer, due to the molecular chain property, exhibits an excellent gas barrier property, for example, of 10 to 20 times higher compared to butyl rubber and the like that are commonly used in a tire, with the same thickness, and it exhibits a low modulus compared to other resins. The polyether-based segment in the copolymer are bonded or dispersed between the polyamide-based segment or polyamide-based resins, thus further lowering the modulus of the base film layer, preventing an increase in stiffness of the base film layer, and preventing crystallization at a high temperature.

Since the polyamide-based resin generally exhibits an excellent gas barrier property, it allows the base film layer to have low air permeability while having a thin thickness. Further, since the polyamide-based resin exhibits a relatively low modulus compared to other resins, even if applied together with a copolymer including specific contents of the polyether-based segment, an inner liner film exhibiting a relatively low modulus property may be obtained, thus improving tire formability. And since the polyamide-based resin has sufficient heat resistance and chemical stability, it may prevent deformation or degeneration of the inner liner film when exposed to chemical substances such as additives and the like or a high temperature condition applied during a tire manufacturing process.

Furthermore, the polyamide-based resin may be used together with a copolymer including a polyamide-based segment and a polyether-based segment to increase its reactivity to an adhesive, such as, a resorcinol-formalin-latex (RFL)-based adhesive. The inner liner film may easily adhere to a carcass part, and an interface break caused by heat or repeated deformations during a tire manufacturing process, or vehicle operation may be avoided to afford sufficient fatigue resistance to the inner liner film.

The polyamide-based resin may have a relative viscosity (sulfuric acid, 96% solution) of about 3.0 to about 3.5, preferably about 3.2 to about 3.4. If the viscosity of the polyamide-based resin is less than 3.0, sufficient elongation may not be secured due to a reduction in toughness, generating damagesduring a tire manufacturing process or automobile operation, and the base film layer may not have properties including gas barrier properties, formability, or the like required for a tire inner liner film. If the viscosity of the polyamide-based resin is greater than 3.5, the modulus or viscosity of the manufactured base film layer may become unnecessarily high, and the tire inner liner may not have appropriate formability or elasticity.

The relative viscosity of the polyamide-based resin is measured using a sulfuric acid 96% solution at room temperature. Specifically, specimens of the polyamide-based resin (for example, a 0.025 g specimen) are dissolved in a sulfuric acid 96% solution at various concentrations to prepare two or more solutions for measurement (for example, polyamide-based resin specimens are dissolved in a sulfuric acid 96% solution at concentrations of 0.25 g/dL, 0.10 g/dL, and 0.05 g/dL to prepare 3 solutions for measurement), and then the relative viscosities of the solutions for measurement may be calculated using a viscosity tube at 25° C. (for example, a ratio of the average viscosity tube-passing time of the measurement solution to the passing time of the sulfuric acid 96% solution).

The polyamide-based resin in the base film layer may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or N-alkoxy alkylate thereof, for example, a methoxy methylate of 6-nylon, a methoxy methylate of 6-610-nylon or a methoxy methylate of 612-nylon. In one embodiment, nylon 6, nylon 66, nylon 46, nylon 11, nylon 12, nylon 610, or nylon 612 may be preferable.

In the manufacturing process of the base film, the polyamide-based resin may be mixed with the above-explained copolymer following by melting to be included in the base film, or precursors of the polyamide-based resin such as monomers or oligomers and the like may be mixed with the above-explained copolymer together with initiators or a catalyst and the like to be included in the base film layer.

Since the copolymer including a polyamide-based segment and a polyether-based segment may bond to, or be dispersed inbetween the polyamide-based resin, it may further decrease the modulus of the base film, and prevent stiffening of the base film layer and crystallization at a high temperature. The inclusion of the copolymer in the base film layer results in a film for a tire inner liner having high elasticity or an elasticity recovery rate while securing excellent mechanical properties including durability, heat resistance, fatigue resistance, and the like. Hence, the inner liner film may exhibit excellent formability. Moreover, the physical properties or performance of a tire using the same may be minimally deteriorated from repeated deformations and high heat generated during automobile operation.

Meanwhile, if the content of the polyether-based segment of the copolymer is about 15 to about 50 wt %, preferably about 20 to about 45 wt %, and more preferably about 22 to about 40 wt %, based on the total weight of the base film layer, the film for a tire inner liner may exhibit excellent properties and performance. If the content of the polyether-based segment of the copolymer is less than 15 wt % based on the total weight of the base film layer, the modulus of the base film layer or tire inner liner film may increase to lower tire formability, or property deterioration due to repeated deformations may largely occur. If the content of the polyether-based segment of the copolymer is greater than 50 wt % based on the total weight of the base film layer, the gas barrier properties required for a tire inner liner may not become inferior, thus lowering tire performance. In addition, the inner liner may not easily adhere to a carcass layer due to lowered reactivity to an adhesive, and a uniform film may not be easily manufactured due to increased elasticity of the base film layer.

The polyether-based segment may be bonded to the polyamide-based segment or dispersed between the polyamide-based resins, and may prevent growth of large crystals in the base film layer during a tire manufacturing process or automobile operation, or prevent easy breakage of the base film layer.

The polyether-based segment may further lower the modulus of the tire inner liner film to increase the tire formability. For example, such modulus allows relatively easy elongation or deformation according to the shape of a tire without the needs for the application of excessive force. The polyether-based segment may prevent film stiffening at a low temperature and crystallization at a high temperature. Damages including tears to the inner liner film caused by constant deformations and the like may be further avoid, and the deformation recovery of the inner liner may be also improved to prevent wrinkle formations on the film due to permanent deformation. Overall, the polyether-based segment may improve durability of a tire or inner liner.

The polyamide-based segment may prevent a large increase in the modulus property while maintaining adequate mechanical properties of the copolymer. The base film layer including the segment may have low air permeability while having a thin thickness, sufficient heat resistance, and chemical stability.

The copolymer including a polyamide-based segment and a polyether-based segment may be obtained by reacting one or more polyamide-based monomers or oligomers and one or more polyether-based monomers or oligomers, or it may be obtained by a polymerization reaction or cross-linking reaction of a polymer including a polyamide-based segment and a polymer including a polyether-based segment.

The copolymer including a polyamide-based segment and a polyether-based segment may be a block copolymer wherein the segments are bonded while forming a block, or it may be a random copolymer wherein the segments are irregularly bonded. The copolymer including a polyamide-based segment and a polyether-based segment may be a copolymer including a product of polymerization of a polymer including a polyamide-based segment and a polymer including a polyether-based segment, or it may be a cross-linked copolymer including a product of a cross-linking reaction between a polymer including a polyamide-based segment and a polymer including a polyether-based segment.

Meanwhile, in the base film layer, the polyamide-based resin and the copolymer including a polyamide-based segment and a polyether-based segment may be uniformly mixed, or may be partly or wholly bonded through polymerization or cross-linking.

In case the copolymer including a polyamide-based segment and a polyether-based segment includes a product of polymerization or a cross-linking reaction between a polymer including a polyamide-based segment and a polymer including a polyether-based segment, the copolymer may include a polymer including a polyamide-based segment or a polymer including a polyether-based segment which do not participate in the polymerization or cross-linking reaction. Accordingly, in the base film, a polymer including a polyamide-based segment or a polymer including a polyether-based segment as well as the polymerization product or cross-linking reaction product may be mixed or bonded with other ingredients. In such case, the sum of the content of the polyether-based segment of the copolymer and the content of the polymer including the polyether-based segment may be about 15 to about 50 wt % based on the total weight of the base film layer, so as to optimize the required properties of the inner liner film.

The polyamide-based segment of the copolymer may include a repeating unit of the following Chemical Formula 1 or Chemical Formula 2.

[Chemical Formula 1]

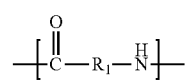

In Chemical Formula 1, $R_1$ is a C1-20 linear or branched alkylene group or a C7-20 linear or branched arylalkylene group.

[Chemical Formula 2]

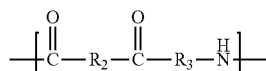

In Chemical Formula 2, $R_2$ is a C1-20 linear or branched alkylene group, and $R_3$ is a C1-20 linear or branched alkylene group or a C7-20 linear or branched arylalkylene group.

In case a base film layer is manufactured using a copolymer including a polyamide-based repeating unit and a polyether-based repeating unit, the polyamide-based segment may be the polyamide-based repeating unit. The polyamide-based segment may be derived from a polymer including a polyamide-based segment used in the manufacturing process of the base film, or one or more polyamide-based monomers or oligomers.

The polyether-based segment of the copolymer may include a repeat unit of the following Chemical Formula 3.

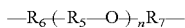  [Chemical Formula 3]

In Chemical Formula 3, $R_5$ is a C1-10 linear or branched alkylene group, n is an integer of from 1 to 100, and $R_6$ and $R_7$ may be identical or different and are independently a direct bond, —O—, —NH—, —COO—, or —CONH—.

In case a base film layer is manufactured using a copolymer including a polyamide-based repeating unit and a polyether-based repeating unit, the polyether-based segment may be the polyether-based repeating unit. The polyether-based segment may be derived from a polymer including a polyether-based segment used in the manufacturing process of the base film, or polyether-based monomers or oligomers.

The copolymer including the polyamide-based segment and the polyether-based segment may have an absolute weight average molecular weight of 50,000 to 300,000, preferably 70,000 to 200,000. If the absolute weight average molecular weight of the copolymer is less than 50,000, the manufactured base film layer may not have sufficient mechanical properties required for use in an inner liner film, and the film for a tire inner liner may not have a sufficient gas barrier property. If the absolute weight average molecular weight of the copolymer is greater than 300,000, the modulus or crystallinity of the base film layer may excessively increase during high temperature heating, and the elasticity or elasticity recovery rate required for an inner liner film may not be secured.

In a solution including the polymer material, light scattering occurs because of the polymer chain, and using the light scattering, an absolute weight-average molecular weight of the polymer material may be measured. Particularly, using a MALS (multiangle light scattering) system (Wyatt Company), parameters in the measurement results may be applied in the Rayleigh-Gans-Debye equation to obtain the absolute weight-average molecular weight of the polymer material.

<Equation 1: Rayleigh-Gans-Debye Equation>

$$K^*C/R(\theta)=1/MP(\theta)+2A_2C$$

In Equation 1, M is molar mass, and is an absolute weight-average molecular weight (Mw) for a polydispersed sample, $R_\theta$ is the excess Rayleigh ratio, $K^*=4\pi^2 n_0^2 (dn/dc)^2 \lambda_0^{-4} N_A^{-1}$, C is polymer concentration (g/ml) in the solution, and $A_2$ is the second virial coefficient. Further, in K*, $n_0$ is the refractive index of the solvent, $N_A$ is Avogadro's number, $\lambda_0$ is the wavelength of a light source under vacuum, $P(\theta)=R_\theta/R_0$, and $R_0$ is incident light.

Meanwhile, the copolymer may include the polyamide-based segment and the polyether-based segment in the weight ratio of about 6:4 to about 3:7, preferably about 5:5 to about 4:6, while the content of the polyether-based segment is about 15 to about 50 wt % based on the total weight of the film.

As explained, if the content of the polyether-based segment is too low, the modulus of the base film layer or tire inner liner film may increase to lower formability of the tire, or properties may be largely degraded due to repeated deformations. On the other hand, if the content of the polyether-based segment is too high, the gas barrier properties of the film for a tire inner liner may be lowered, the inner liner may not easily adhere to a carcass layer due to lowered reactivity to adhesive, and a uniform film may not be easily manufactured due to increased elasticity of the base film layer.

In the base film layer, the polyamide-based resin and the above explained copolymer may be included in the weight ratio of about 6:4 to about 3:7, and preferably about 5:5 to about 4:6. If the content of the polyamide-based resin is too low, the density or gas barrier properties of the base film layer may be lowered. If the content of the polyamide-based resin is too high, the modulus of the base film layer may become excessively high or formability of the tire may be lowered, the polyamide-based resin may be crystallized under a high temperature environment during a tire manufacturing process or automobile operation, and cracks may be generated due to repeated deformations.

Meanwhile, the base film layer may be an unstretched film. If the base film layer is an unstretched film, it may have a low modulus and high strain, and thus it may be appropriately applied in a tire forming process during which high expansion is generated. Since crystallization hardly occurs in the unstretched film, damages such as cracks and the like may be prevented even if deformations repeatedly occur. Since the unstretched film is unlikely to have much difference in terms of its properties depending on the orientation in a specific direction, an inner liner having uniform properties may be obtained. As described in the following manufacturing method of a film for a tire inner liner, the base film may be manufactured in the form of an unstretched or non-oriented film by preventing the orientation formation in the base film layer, for example, by a viscosity control through optimization of melt-extrusion temperature, a modification of die standard, a control of the installation location of a cooling roller, a control of the installation location of an air knife, a control of the installation location of a pinning device (electrostatic charging device), a control of winding speed, and the like.

If an unstretched film is applied for the base film layer, a film for an inner liner may be easily prepared in a cylindrical- or sheet-type in a tire manufacturing process. According to one embodiment, in case an unstretched sheet-type film is applied for the base film layer, no separate film manufacturing facilities depending on the size of the tire is needed, and more importantly, physical impacts and wrinkles may be minimized during transfer and storage. In another embodiment, in case the base film is manufactured in a sheet type, a process of adding an adhesive layer may be more easily conducted, and damages, deformations, or the like generated during a manufacturing process due to a difference in standards or a tire forming drum may be prevented.

Meanwhile, the adhesive layer including the resorcinol-formalin-latex (RFL)-based adhesive has excellent adhesion and adhesion maintenance to the base film layer and a tire carcass layer, and thus a break of the interface between the inner liner film and the carcass layer, which is generated due to heat generated during a tire manufacturing process or running, or repeated deformations, may be prevented to afford sufficient fatigue resistance to the inner liner film.

Particularly, if an adhesive layer including the resorcinol-formalin-latex (RFL)-based adhesive is formed on the base film layer, it may be stably bonded to a tire without applying an additional vulcanization process or largely increasing the thickness of the adhesive layer.

The above-explained properties of the adhesive layer result from inclusion of a specific resorcinol-formalin-latex (RFL)-based adhesive having a specific composition. A rubber-type tie gum, an adhesive for a tire inner liner, required an additional vulcanization process. To the contrary, since the adhesive layer includes a resorcinol-formalin-latex (RFL)-based adhesive having a specific composition, it has high reactivity and adhesion to the base film, and the base film and a tire carcass layer may be stably bonded by pressing under a high temperature heating condition without largely increasing the thickness. Thereby, lightening of the tire weight and improvement in fuel efficiency may be achieved, and a separation between the base film or inner liner layer and a carcass layer may be prevented even if deformations repeatedly occur during a tire manufacturing process or automobile operation. Since the adhesive layer may exhibit high fatigue resistance to physical/chemical deformations, deterioration of adhesion or the like may be minimized in a high temperature manufacturing process or automobile operationprocess during which mechanical deformations occur for a long period of time.

Furthermore, the resorcinol-formalin-latex (RFL)-based adhesive allows a cross-linking between latex and rubber to provide superior adhesion performance, while having a low curing degree because it is physically a latex polymerization product and thus is flexible like rubber. The chemical bonding between the methylol end group of a resorcinol-formalin polymerization product and the base film is also possible Thus, if the resorcinol-formalin-latex (RFL)-based adhesive is applied to the base film, sufficient adhesion may be achieved.

The resorcinol-formalin-latex (RFL)-based adhesive may include about 2 to about 32 wt %, preferably about 10 to about 20 wt %, of a condensate of resorcinol and formaldehyde, and about 68 to about 98 wt %, preferably about 80 to about 90 wt %, of latex.

The condensate of resorcinol and formaldehyde may be obtained by mixing resorcinol and formaldehyde in the mole ratio of about 1:0.3 to about 1:3.0, preferably about 1:0.5 to about 1:2.5, followed by conducting condensation. The condensate of resorcinol and formaldehyde may be included in the content of about 2 wt % or more based on the total weight of the adhesive layer for excellent adhesion, and it may be included in the content of about 32 wt % or less to secure optimum fatigue resistance.

The latex may be at least one selected from natural rubber latex, styrene/butadiene rubber latex, acrylonitrile/butadiene rubber latex, chloroprene rubber latex, styrene/butadiene/vinylpyridine rubber latex, and a mixture thereof. The latex may be included in the content of about 68 wt % or more based on the total weight of the adhesive layer for flexibility and effective cross-linking reaction with rubber, and it may be included in the content of about 98 wt % or less for a chemical reaction with the base film and stiffness of the adhesive layer.

The adhesive layer may further include at least one additive such as a surface tension control agent, an anti-foaming agent, a filler, and the like. Although the surface tension control agent is applied for uniform coating of the adhesive layer, it may cause a decrease in adhesion when introduced in an excessive amount, and thus it may be included in the content of about 2 wt % or less, or about 0.0001 to about 2 wt %, preferably about 1.0 wt % or less, or about 0.0001 to about 0.5 wt %, based on the total weight of the adhesive layer. The surface tension control agent may be at least one selected from a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of about 0.1 to about 20 µm, preferably about 0.1 to about 10 µm, more preferably about 0.2 to about 7 µm, still more preferably about 0.3 to about 5 µm, and it may be formed on one side or both sides of the film for a tire inner liner. If the thickness of the adhesive layer is too thin, the adhesive layer itself may become thinner during tire expansion, cross-linking adhesion between a carcass layer and the base film may be lowered, and stress may be concentrated on a part of the adhesive layer to lower the fatigue resistance property. If the thickness of the adhesive layer is too thick, a separation at the interface may occur to lower the fatigue resistance property. To adhere the inner liner film to a carcass layer of a tire, the adhesive layer is generally formed on one side of the base film, but in case a multi-layered inner liner film is applied, or an adhesion to rubber on both sides is required according to a tire forming method and construction design, for example when an inner liner film covers a bead part, the adhesive layer may be formed on both sides of the base film.

Meanwhile, the base film layer may have a thickness of about 30 to about 300 µm, preferably about 40 to about 250 µm, and more preferably about 40 to about 200 µm. Thus, the film for a tire inner liner according to one embodiment of the invention may have low air permeability, for example, oxygen permeability of 200 cc/($m^2$·24 h·atm) or less, while having a thin thickness compared to those previously known.

Meanwhile, if the base film layer is 100% elongated at room temperature, stress of 10 to 35 Mpa, preferably 15 to 30 Mpa, may be generated. The base film may have yield point stress of 35 Mpa or less, preferably 30 Mpa or less, at room temperature, and still more preferably, the yield point may not exist. The film for a tire inner liner, due to the low modulus property, may be elongated or deformed according to the shape of a tire, even if a low force is applied during tire forming. Thereby, easier forming is enabled without damage to a film or deformation of a tire in a tire manufacturing process, and due to the low modulus property, high fatigue resistance to physical deformation during a tire manufacturing process or automobile running may be achieved.

Particularly, if stress of the base film is greater than 35 Mpa at 100% elongation at room temperature, an appropriate tire shape may not be manufactured with a low forming pressure of a tire-forming machine, and thus problems such as tearing of the film or deformation of the green tire shape after forming may be generated. In case the base film has an excessive stress property, even if a tire is manufactured after modifying the forming machine or forming method, external force such as sever tension and compressive strain, which may be generated during automobile running by the properties of a stiff film, may be concentrated on a specific area of the film, and thus product quality problems such as crack generation on the film or tearing of the film may be generated.

Meanwhile, according to another embodiment of the invention, there is provided a method for manufacturing the film for a tire inner liner, including: mixing a copolymer including a polyamide-based segment and polyether-based segment, and a polyamide-based resin, and melting and extruding the mixture at about 230 to about 300° C. to form a base film layer; and forming an adhesive layer including a resorcinol-formalin-latex (RFL)-based adhesive on at least one side of the base film layer.

In the film for a tire inner liner manufactured by the above method, the tensile recovery rate of the base film layer as defined by the Formula 1 may be about 30% to about 80%, preferably about 36% to about 64%, and thereby the film for a tire inner liner may exhibit an elasticity behavior or shape recovery property similar to other tire constituting parts including rubber, for example, the carcass and the like.

$$\text{Tensile Recovery Rate}(\%) = (L_1 - L_2) \times 100/(L_1 - L_0) \quad \text{[Formula 1]}$$

In Formula 1, $L_1$ denotes the length of the base film at 100% elongation at room temperature, $L_2$ denotes the final length of the base film when the base film is shrunken after 100% elongation at room temperature, and $L_0$ denotes the length of the original sample before elongation.

If a base film layer formed using a polyamide-based resin together with a copolymer including the polyamide-based segment and the polyether-based segment is used, an excellent gas barrier property may be achieved with a thin thickness, thus enabling light weight of a tire and improving automobile mileage, and mechanical properties including excellent formability and high durability and fatigue resistance may be achieved while having high heat resistance.

Further, since the base film layer may exhibit high reactivity to an adhesive (for example, a resorcinol-formalin-latex (RFL)-based adhesive and the like) due to the above properties, if an adhesive layer including a resorcinol-formalin-latex (RFL)-based adhesive is formed on the base film layer, it may be stably bonded to a tire without applying an additional vulcanization process or largely increasing the thickness of the adhesive layer.

As explained above, the polyamide-based resin may have relative viscosity (96% sulfuric acid solution) of about 3.0 to about 3.5, preferably about 3.2 to about 3.4. The details of the polyamide-based resin are as explained above.

The content of the polyether-based segment of the copolymer may be about 15 to about 50 wt %, preferably about 20 to about 45 wt %, and more preferably about 22 to about 40 wt %, based on total weight of the base film layer. The details of the content of the polyether-based segment of the copolymer are as explained above.

The details of the polyamide-based resin and the copolymer including the polyamide-based segment and the polyether-based segment are as explained above.

The polyamide-based resin may be included in the base film by mixing or compounding it with the above-explained copolymer followed by melting, or it may be included in the base film by mixing the precursor of the polyamide-based resin such as monomers or oligomers and the like with the above-explained copolymer together with a reaction initiator, a catalyst, and the like.

The copolymer including a polyamide-based segment and a polyether-based segment may be included in the base film by mixing or compounding the copolymer itself with the polyamide-based resin followed by melting.

The base film layer may be formed by mixing or compounding a polymer including a polyamide-based segment and a polymer including a polyether-based segment, conducting polymerization or a cross-linking reaction, and mixing the product of the polymerization or cross-linking reaction with the polyamide-based resin followed by melting. The two kinds of polymers may be polymerized or cross-linked by mixing or compounding a polymer including a polyamide-based segment and a polymer including a polyether-based segment, and mixing the mixture or compounded substance with a polyamide-based resin followed bymelting to form the base film layer.

In the base film layer, the polyamide-based resin and the copolymer including the polyamide-based segment and polyether-based segment may be uniformly mixed, or partially or wholly bonded through polymerization or cross-linking.

Meanwhile, in the step of forming the base film layer, to extrude a film having a more uniform thickness, the copolymer and the polyamide-based resin may be controlled so as to have a uniform size. Controlling the sizes of the copolymer and the polyamide-based resin may be achieved by uniformly mixing them in the step of mixing, in the step of maintaining them within a feeder at a constant temperature, or in the step of melting and extruding so as to prevent the copolymer and the polyamide-based resin from becoming excessively large by, for example, agglomeration, and thus a base film having a more uniform thickness may be formed.

If the copolymer and the polyamide-based resin have similar sizes, agglomeration of raw material chips or generation of non-uniform shapes or areas may be minimized in the subsequent mixing, melting, or extruding step, thereby forming a base film layer having a uniform thickness throughout the film, though the sizes of the copolymer and the polyamide-based resin that may be used in the manufacturing method are not specifically limited thereto.

The method for preparing the film for a tire inner liner may further include mixing the polyamide-based resin and the copolymer in the weight ratio of about 6:4 to about 3:7. If the content of the polyamide-based resin is too low, the density or gas barrier properties of the base film layer may be lowered. If the content of the polyamide-based resin is too high, the modulus of the base film layer may become too high, or formability of a tire may be lowered, the polyamide-based resin may be crystallized under a high temperature environment during a tire manufacturing process or automobile operation, and cracks may be generated due to repeated deformations. In the mixing step, equipments or methods generally well known for mixing a polymer resin may be used without specific limitations.

The polyamide-based resin and the copolymer may be introduced into a feeder after they are mixed, or may be sequentially or simultaneously introduced into a feeder and mixed.

As explained above, the copolymer may include a polyamide-based segment and a polyether-based segment in the weight ratio of about 6:4 to about 3:7.

A mixture of the polyamide-based resin and the copolymer may be supplied to an extrusion die through a feeder maintained at a specific temperature, for example, at a temperature of about 50 to about 100° C. Since the feeder is maintained at a temperature of about 50 to about 100° C., the mixture of the polyamide-based resin and the copolymer may have properties including appropriate viscosity and the like, and thus may be easily moved to other parts of the extrusion die or extruder, so defective feeding that is generated by agglomeration of the mixture and the like may be prevented, and a more uniform base film may be formed in the subsequent melting and extruding process. The feeder functions for supplying raw materials introduced in an extruder to the extrusion die or other parts, and the constitution is not specifically limited, but it may be a common feeder included in an extruder for preparing a polymer resin.

By melting and extruding the mixture supplied to the extrusion die through the feeder at about 230 to about 300° C., a base film layer may be formed. The melting temperature may be about 230 to about 300° C., and preferably about 240 to about 280° C. The melting temperature should be higher than the melting point of the polyamide-based compound, but if it is too high, carbonization or decomposition may occur to lower properties of a film, and bonding between the polyether-based resins may occur or orientation may be generated along the fiber arrangement direction, which may be unfavorable for manufacturing an unstretched film.

As the extrusion die, those known to be usable for an extruding polymer resin may be used without specific limitations, but a T-type die may be preferably used so that the thickness of the base film may become more uniform or orientation may not be generated in the base film.

The step of forming the base film layer may include extruding a mixture of the polyamide-based resin and the copolymer including a polyamide-based segment and a polyether-based segment to a film with a thickness of about 30 to about 300 μm. The thickness of the manufactured film may be controlled by controlling extrusion conditions, for example, the discharge rate of the extruder or the gap of extrusion die, or by modifying the winding speed in the cooling process or the recovery process of the extrudate.

To control the thickness of the base film layer uniformly in the range of about 30 to about 300 μm, the die gap of the extrusion die may be controlled to be about 0.3 to about 1.5 mm. In the step of forming the base film, if the die gap is too small, shear pressure and shear stress in the melting-extrusion process may become too high, and thus the uniform shape of the extruded film may not be formed and productivity may be lowered. If the die gap is too large, stretching of the extruded film may largely occur to generate orientation, and properties of the manufactured based film exhibited in the longitudinal direction may be noticeably different from those in the transverse direction.

Furthermore, the thickness of the prepared base film may be continuously measured, and the measurement results may be monitored to control the one or more parts of the extrusion die such as a lip gap adjustment bolt of the T-die, where a non-uniform thickness appears to reduce deviations from the standard base film, thereby obtaining a film having a uniform thickness. The measurement of the film thickness-feed back-control of the extrusion die may constitute an automated process step using an automated system, for example an Auto Die system and the like.

Meanwhile, the manufacturing method of the film for a tire inner liner may further include a step of solidifying the base film layer formed through melting and extrusion in a cooling part maintained at a temperature of about 5 to about 40° C., and preferably about 10 to about 30° C.

By solidifying the base film layer formed through melting and extrusion in a cooling part while maintaining a temperature of 5 to 40° C., a film with a more uniform thickness may be provided. If the base film layer formed through melting and extrusion is folded or attached to a cooling part maintained at an appropriate temperature, orientation may not substantially occur, and the base film layer may be provided as an unstretched film.

The solidifying step may include uniformly attaching the base film formed through melting and extrusion to a cooling roll maintained at a temperature of about 5 to about 40° C., using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion, partially non-uniform cooling, or the like may be prevented, and the formation of areas having a relatively thick or thin thickness deviating from the uniform thickness of surrounding parts in the film may be substantially avoided.

The molten material extruded under specific die gap conditions may be attached or folded to a cooling roll installed at a horizontal distance of about 10 to about 150 mm, and preferably about 20 to about 120 mm from the die outlet, to eliminate stretching and orientation. The horizontal distance from the die outlet to the cooling roll may be a distance between the die outlet and a point where discharged molten material is folded to the cooling roll. If the linear distance between the die outlet and the cooling roll attaching point of the molten film is too small, uniform flow of extrusion of the resin may be disturbed and the film may be cooled in a non-uniform manner, and if the distance is too large, inhibition of film stretching may not be achieved.

In the step of forming the base film, except for the above-explained steps and conditions, film extrusion conditions commonly used for manufacturing of a polymer film, for example, screw diameter, screw rotation speed, line speed, and the like may be appropriately selected.

Meanwhile, the manufacturing method of the film for a tire inner liner may include a step of forming an adhesive layer including a resorcinol-formalin-latex (RFL)-based adhesive on at least one side of the base film layer.

The adhesive layer including the resorcinol-formalin-latex (RFL)-based adhesive may be formed by coating the resorcinol-formalin-latex (RFL)-based adhesive on one side of the base film layer, or by laminating an adhesive film including the resorcinol-formalin-latex (RFL)-based adhesive on one side of the base film layer.

The step of forming the adhesive layer may be progressed by coating the resorcinol-formalin-latex (RFL)-based adhesive on one side or both sides of the base film followed by drying. The formed adhesive layer may have a thickness of about 0.1 to about 20 μm, and preferably about 0.1 to about 10 μm. The resorcinol-formalin-latex (RFL)-based adhesive may include about 2 to about 32 wt % of a condensate of resorcinol and formaldehyde, and about 68 to about 98 wt %, preferably about 80 to about 90 wt %, of latex.

The details of the resorcinol-formalin-latex (RFL)-based adhesive with the above specific composition are as explained above.

Commonly used coating methods or apparatuses may be used to coat the adhesive without specific limitations. For example, knife coating, bar coating, gravure coating or spraying, or immersion may be used, and knife coating, gravure coating, or bar coating may be used for uniform coating of the adhesive.

After forming the adhesive layer on one side or both sides of the base film, drying and adhesive reactions may be simultaneously progressed, but heat treatment may be conducted after drying considering the reactivity of the adhesive. Further, the formation of the adhesive layer and drying and heat treatment may be applied multipletimes for the adjustment of the thickness of the adhesive layer, or for the application of a multi-layered adhesive. After coating the adhesive on the base film, heat treatment may be conducted by solidifying and reacting at at the range of about 100 to 150° C. for approximately 30 seconds to 3 minutes.

In the step of forming the copolymer or mixture, or in the step of melting and extruding the copolymer, additives such as a heat resistant antioxidant, heat stabilizer, or the like may be additionally added. The details of the additives are as explained above.

Hereinafter, preferable examples are presented, but these examples are only to illustrate the invention and the scope of the invention is not limited thereto.

EXAMPLE

Manufacture of a Film for a Tire Inner Liner

Example 1

(1) Manufacture of a Base Film 60 wt % of polyamide-based resin (nylon 6) with relative viscosity (96 sulfuric acid solution) of 3.4 and 40 wt % of a copolymer resin having a weight average molecular weight of 100,000 (synthesized using 50 wt % of polyethylene glycol with an amine end group (absolute weight average molecular weight 150,000) and 50 wt % of nylon 6 resin) were mixed, and the mixture was extruded at 260° C. with a T-type die to prepare an unstretched base film with a thickness of 70 μm at a speed of 30 m/min without passing stretching and heat treatment sections. The thickness of the film was measured using a gauge tester.

(2) Preparation of an Adhesive Layer Composition

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/1,3-butadiene/vinylpyridine latex were mixed to obtain a mixture of resorcinol/formaldehyde-latex with a concentration of 20%.

(3) Manufacture of a Film for a Tire Inner Liner

On both sides of the base film (200 mm×300 mm), the resorcinol-formalin-latex (RFL)-based adhesive layer composition was coated using a gravure coater. It was then dried and heat treated in a hot-air oven at 150° C. for 60 seconds to manufacture a film for a tire inner liner including adhesive layers respectively having a 3.0 μm thickness on both sides.

Example 2

(1) Manufacture of a Base Film 50 wt % of a polyamide-based resin (nylon 6) with relative viscosity (96% sulfuric acid solution) of 3.4 and 50 wt % of a copolymer resin having a weight average molecular weight of 100,000 (synthesized using 50 wt % of polyethylene glycol with an amine end group (absolute weight average molecular weight 150,000) and 50 wt % of nylon 6 resin) were mixed, and the mixture was extruded at 260° C. with a T-type die to prepare an unstretched base film with a thickness of 70 μm at a speed of 30 m/min without passing stretching and heat treatment sections.

(2) Preparation of an Adhesive Layer Composition

A mixture of resorcinol-formaldehyde-latex with a concentration of 20% was obtained by the same method as Example 1.

(3) Manufacture of a Film for a Tire Inner Liner

A film for a tire inner liner including adhesive layers respectively having a 3.0 μm thickness on both sides was manufactured by the same method as Example 1, except for using the above-manufactured base film.

Example 3

(1) Manufacture of a Base Film

To a mixture of 70 wt % of ε-caprolactam for polymerization of a resin for a base film and 30 wt % of polyoxyethylene diamine (Mw 1000), adipic acid was added in the same mole number as the polyoxyethylene diamine, and the mixture was melted at 100° C. for 30 minutes under a nitrogen atmosphere. The molten liquid was heated at 250° C. for 3 hours, the pressure was increased to 8 kg/cm$^3$ and maintained, and the pressure was then reduced to 1 kg/cm$^2$ for 1 hour.

The molten liquid was manufactured into a chip shape, and then the manufactured chips were was extruded at 260° C. with a ring-shaped die to obtain an unstretched base film with a thickness of 70 μm at a speed of 30 m/min without passing stretching and heat treatment sections.

(2) Preparation of an Adhesive Layer Composition

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/butadiene-1,3/vinylpyridine latex were mixed to obtain a mixture of resorcinol/formaldehyde-latex with a concentration of 20%.

(3) Manufacture of a Film for a Tire Inner Liner

On both sides of the base film (200 mm×300 mm), the resorcinol-formalin-latex (RFL)-based adhesive composition was coated using a gravure coater. It was then dried and heat treated in a hot-air oven at 150° C. for 60 seconds to manufacture a film for a tire inner liner including adhesive layers respectively having a 3.0 μm thickness on both sides of the base film.

Example 4

(1) Preparation of a Base Film

To a mixture of 60 wt % of ε-caprolactam for polymerization of a resin for a base film and 40 wt % of polyoxyethylene diamine (Mw 1000), adipic acid was added in the same mole number as the polyoxyethylene diamine, and the mixture was melted at 100° C. for 30 minutes under a nitrogen atmosphere. The molten liquid was heated at 250° C. for 3 hours, the pressure was increased to 8 kg/cm$^2$ and maintained, and the pressure was reduced to 1 kg/cm$^2$ for 1 hour.

The molten liquid was manufactured into a chip shape, and then the manufactured chips were extruded at 260° C. with a ring-shaped die to obtain an unstretched base film with a thickness of 70 μm at a speed of 30 m/min without passing stretching and heat treatment sections.

(2) Preparation of an Adhesive Layer Composition

A mixture of resorcinol/formaldehyde-latex with a concentration of 20% was obtained by the same method as Example 3.

(3) Manufacture of a Film for a Tire Inner Liner

A film for a tire inner liner including adhesive layers respectively having a 3.0 μm thickness on both sides of the base film was manufactured by the same method as Example 1, except for using the above-manufactured base film.

Example 5

(1) Manufacture of a Base Film 50 wt % of a polyamide-based resin (nylon 6) with a relative viscosity (96% sulfuric acid solution) of 3.4 and 50 wt % of a copolymer resin having a weight average molecular weight of 100,000 (including 40 wt % of a polyamide-based repeating unit and 60 wt % of a polyether-based repeating unit) were mixed, and the mixture was extruded at 260° C. with a T-type die to prepare an unstretched base film with a thickness of 70 μm at a speed of 30 m/min without passing stretching and heat treatment sections.

(2) Preparation of an Adhesive Layer Composition

A mixture of resorcinol/formaldehyde-latex with a concentration of 20% was obtained by the same method as Example 1.

(3) Manufacture of a Film for a Tire Inner Liner

A film for a tire inner liner including adhesive layers respectively having a 3.0 μm thickness on both sides of the base film was manufactured by the same method as Example 1, except for using the above-manufactured base film.

COMPOARATIVE EXAMPLES

Manufacture of a Film for a Tire Inner Liner

Comparative Example 1

A film for a tire inner liner was manufactured by the same method as Example 1, except for changing the contents of the polyamide-based resin and a copolymer resin with a weight average molecular weight of 100,000, respectively, to 97 wt % and 3 wt %.

Comparative Example 2

A film for a tire inner liner was manufactured by the same method as Example 1, except that 80 wt % of a polyamide-based resin (nylon 6) with relative viscosity (96% sulfuric acid solution) of 3.4 and 20 wt % of a copolymer resin having a weight average molecular weight of 100,000 (including 50 wt % of a polyamide-based repeating unit and 50 wt % of a polyether-based repeating unit) were mixed, and the mixture was extruded at 260° C. with a T-type die to manufacture an unstretched base film with a thickness of 70 μm at a speed of 30 m/min without passing stretching and heat treatment sections.

Comparative Example 3

A film for a tire inner liner was manufactured by the same method as Example 3, except for changing the contents of ε-caprolactam and polyoxyethylene diamine (Mw 1000) respectively to 20 wt % and 80 wt %.

However, in Comparative Example 2, thickness control was very difficult because of high elasticity during film manufacture, and resonance wherein melting was periodically varied occurred during film formation.

Comparative Example 4

A release agent and a finishing agent were introduced and mixed with butyl rubber, and then refined to obtain a film for a tire inner liner with a thickness of 70 μm, and an adhesive rubber (tie gum) was formed on the inner liner film.

Meanwhile, in the case of Comparative Example 3, the tensile recovery rate of the base film was measured with a vulcanized sample in the following Experimental Example 1, and stress measurement of the film was conducted in a non-vulcanized state in Experimental Example 2. Particularly, the tensile recovery rate of the tire inner liner film of Comparative Example 3 was measured using a vulcanized tire inner liner film that was obtained by vulcanizing a tire inner liner film with a thickness of 70 μm obtained by mixing and refining butyl rubber at a pressure of 60 kg/cm² at 150° C. for 30 minutes.

EXPERIMENTAL EXAMPLES

Experimental Example 1

Measurement of Tensile Recovery Rate of Base Film

The tensile recovery rate of the base films obtained in Examples 1~4 and Comparative Examples 1~3 were measured as follows.

First, a specimen of the unstretched base film before forming an adhesive layer using a resorcinol-formalin-latex (RFL)-based adhesive was prepared with a width of 10 mm and a length of 100 mm in the MD (machine direction). The prepared specimen was allowed to stand at a room temperature condition (25° C., 60 RH %) for 24 hours, and then the tensile recovery rate measurement test of the base film was conducted under the following conditions using a universal testing machine.

(1) Measurement apparatus: universal testing machine (Model 4204, Instron Company)

(2) Measurement conditions:

i) Head Speed 300 mm/min, ii) Grip Distance 100 mm, iii) Sample Width 10 mm, iv) Measured under 25° C. and 60 RH % atmosphere v) Grip was removed 10 seconds after 100% elongation.

vi) Grip-removed sample was allowed to stand for 1 hour, and then the length was measured.

(3) Each was measured 5 times, and the average of the obtained results was calculated.

From the measurement values of the length of the base film specimen, the tensile recovery rate of the base film was calculated according to the following General Formula 1.

Tensile recovery rate(%)=$(L_1-L_2)*100/(L_1-L_0)$ [General Formula 1]

In the General Formula 1, $L_1$ denotes the length of the base film layer at 100% elongation at room temperature, $L_2$ denotes the final length of the base film layer when the base film is shrunken after 100% elongation at room temperature, and $L_0$ denotes the length of the original specimen before elongation.

Herein, the length of the elongated base film refers to the length of the base film (sample) before a grip is removed after elongation, when measured using a universal testing machine, and the recovered length of the base film after tension refers to the recovered length of the base film (sample) by elasticity after the grip is removed after elongation.

The tensile recovery rate of the base film of the tire inner liner film, measured by the above method, is shown in the following Table 1.

TABLE 1

| | Film length before tension test ($L_0$, mm) | Film length at 100% elongation film ($L_1$, mm) | Recovered film length after elongation ($L_2$, mm) | Tensile recovery rate (%) |
|---|---|---|---|---|
| Example 1 | 100 | 200 | 160 | 40 |
| Example 2 | 100 | 200 | 155 | 45 |
| Example 3 | 100 | 200 | 148 | 52 |
| Example 4 | 100 | 200 | 140 | 60 |
| Example 5 | 100 | 200 | 144 | 56 |
| Comparative Example 1 | 100 | 200 | 195 | 5 |
| Comparative Example 2 | 100 | 200 | 193 | 7 |
| Comparative Example 3 | 100 | 200 | 115 | 85 |
| Comparative Example 4 | 100 | 200 | 110 | 90 |

Experimental Example 2

Evaluation of Properties of a Film for a Tire Inner Liner

For the films for a tire inner liner including an adhesive layer including the resorcinol-formalin-latex (RFL)-based adhesive obtained according to Examples 1~4 and Comparative Examples 1~3, properties were measured as follows.

2.1 Measurement of Stress of Film

Yield point stress, 100% tensile stress, and 200% tensile stress were measured based on MD (machine direction) of the tire inner liner film. the specific measurement method is as follows.

(1) Measurement apparatus: universal testing machine (Model 4204, Instron Company)

(2) Measurement conditions:
  i) Head Speed 300 mm/min,
  ii) Grip Distance 100 mm,
  iii) Sample Width 10 mm,
  iv) Measured under 25° C. and 60 RH % atmosphere (3) Each measured 5 times, and the average of the obtained results was calculated.

2.2 Measurement of Oxygen Permeability

Oxygen permeability of the tire inner liner film was measured under a 25° C. and 60 RH % atmosphere using an Oxygen Permeation Analyzer, Model 8000, (Illinois Instruments Inc.) according to ASTM D 3895.

2.3 Evaluation of Adhesion Performance

Adhesion performance of the tire inner liner film to a tire carcass layer was measured according to ASTM D 4394.

Specifically, a 1.6 mm rubber sheet, a cord, a film for a tire inner liner having the adhesive layer, a 1.6 mm rubber sheet, a cord, and a 1.6 mm rubber sheet were sequentially laminated and then vulcanized at a pressure of 60 kg/cm² at 150° C. for 30 minutes to manufacture an adhesion specimen, which was then cut to a width of 1 inch to use for evaluation of adhesion performance. The 1.6 mm rubber, sheet, cord, and 1.6 mm rubber sheet, which are laminated after the tire inner liner film, form a carcass layer. Herein, the rubber sheet was manufactured using a rubber composition including, based on 100 wt % of natural rubber, 3 wt % of zinc oxide, 29.8 wt % of carbon black, 2.0 wt % of stearic acid, 7.0 wt % of pine tar, 1.25 wt % of mercaptobenzothiazole, 3.0 wt % of sulfur, 0.15 wt % of diphenyl guanidine, and 1.0 wt % of phenylbetanaphthaamine.

The cut adhesion specimen was peeled off at 25° C. at a speed of 300 mm/min with a universal testing machine (Instron), and adhesion (kgf) was evaluated 2 times and the average value was calculated.

The results of measurement and evaluation of the properties of the tire inner liner films manufactured in Examples 1~4 and Comparative Examples 1~3 are shown in the following Table 2.

TABLE 2

| | Thickness (μm) | Yield point stress (Mpa) | 100% tensile stress (MPa) | 200% tensile stress (MPa) | Oxygen permeability (cc/m²·24 h·atm) | Peel adhesion (kgf) |
|---|---|---|---|---|---|---|
| Example 1 | 70 | 35 | 31 | 37 | 65 | 37 |
| Example 2 | 70 | 34 | 29 | 34 | 73 | 34 |
| Example 3 | 70 | 30 | 25 | 29 | 81 | 33 |
| Example 4 | 70 | 21 | 19 | 23 | 98 | 33 |
| Example 5 | 70 | 29 | 27 | 32 | 79 | 33 |
| Comparative Example 1 | 70 | 61 | 46 | 56 | 5 | 38 |
| Comparative Example 2 | 70 | 60 | 46 | 54 | 5 | 35 |
| Comparative Example 3 | 70 | — | 17 | 19 | 815 | 22 |
| Comparative Example 4 | 70 | — | 11.4 | 13 | 725 | — |

As shown in Table 1, it can be seen that the tire inner liner film of Examples 1~4 have low yield point stress compared to the film of Comparative Example 1, and low 100% and 200% tensile stress, namely low stress in a deformation section generated during tire forming. From the results, it can be seen that in the case of the tire inner liner films of Examples 1 to 4, there is no need to give excessive expansion force during forming, fractures due to insufficient deformability of the film are not generated, and shape abnormality of a green tire due to a large property difference between non-vulcanized rubber and a film is not generated.

Further, adhesion of the tire inner liner films of Examples 1 to 4 to a tire carcass layer was 20 kgf or more, as measured according to ASTM D 4394, and thus it was confirmed that the tire inner liner films of Examples 1 to 4 may be very uniformly and stably bonded to a tire carcass layer. From the results, it was confirmed that if the tire inner liner films of Examples 1 to 4 are applied, sufficient stretching may be achieved even if expansion pressure is applied during a tire manufacturing process, and the manufactured state of the green tire or final tire may be very good.

To the contrary, in the case of Comparative Example 1, very high stress was generated due to crystallization of the film during tire manufacture, and fractures were generated. In the case of Comparative Examples 2 and 3, although tire formability was similar to Examples 1 to 4, oxygen permeability was very high as 815 cc/(m²·24 h·atm) and 725 cc/(m²·24 h·atm), respectively, thus confirming that they do not have a sufficient internal pressure retention property for practical tire application.

Experimental Example 3

Evaluation of Tire Properties

For the tires manufactured using the tire inner liner films of Examples 1 to 4 and Comparative Examples 1 to 3, properties were measured as follows.

3.1 Evaluation of Formability and Appearance

First, a green tire was manufactured using the tire inner liner film with the 205R/65R16 standard, and then vulcanization was conducted to manufacture the final tire.

For the manufactured tire, manufacturability and appearance were measured after manufacturing the green tire, and the final appearance of the tire was measured after vulcanization.

Specifically, formability of the green tire is judged as "good" when there is no crushing of the green tire after forming, and the standard deviation of diameter is within 5%, or the inner liner film is well attached to the inside of the green tire, and it is judged as "shape faulty" when crushing of the green tire is generated after forming, the standard deviation of diameter is greater than 5%, or the inner liner film is separated or is not uniformly attached in the green tire.

Further, when there is no crushing of the tire after vulcanization of the green tire and the standard deviation of diameter is within 5%, it is judged as "good", and when tire crushing is generated after vulcanization of the green tire and thus the tire is not properly manufactured, the inner liner in the tire is dissolved or torn and damaged, or the standard deviation of diameter is greater than 5%, it is judged as "shape faulty".

3.2 Evaluation of Internal Pressure Retention

As explained above, a tire was manufactured using the tire inner liner film, and then, 90-day IPR (internal pressure retention) was measured and compared/evaluated as shown in the following Equation 2, under a 21° C. temperature and a 101.3 kPa pressure according to ASTM F 1112-06.

$$\text{Internal pressure retention (\%)} = \left\{1 - \frac{\text{Internal pressure of the tire at first evaluation} - \text{Internal pressure of the tire after standing for 90 days}}{\text{Internal pressure of the tire at first evaluation}}\right\} * 100 \quad \text{[Equation 2]}$$

The results of measurement and evaluation of the properties of the tires manufactured using the tire inner liner films of Examples 1 to 4 and Comparative Examples 1 to 3 are shown in the following Table 3.

TABLE 3

| | Manufactured state of green tire | State of the final tire | Internal pressure retention for 90 days (%) |
|---|---|---|---|
| Example 1 | good | good | 98.2 |
| Example 2 | good | good | 97.7 |
| Example 3 | good | good | 97.7 |
| Example 4 | good | good | 97.4 |
| Example 4 | good | good | 97.6 |
| Comparative Example 1 | shape faulty (fracture) | — | — |
| Comparative Example 1 | shape faulty (fracture) | — | — |
| Comparative Example 3 | good | good | 81.5 |
| Comparative Example 4 | good | good | 83 |

As shown in Table 3, if the tire inner liner films of Examples 1 to 4 wherein tensile recovery rate of the base film was optimized according to the present invention are applied, sufficient tension may be achieved even if expansion pressure is applied during a tire manufacturing process, and thus the manufactured state of the green tire or final tire is good. Therefore, it can be seen that the tire inner liner films of Examples 1 to 4 may exhibit an excellent gas barrier property with a thin thickness, and improve formability of the green tire or final tire due to a low modulus.

Further, the tire manufactured using the tire inner liner films of Examples 1 to 4 has high internal a pressure retention of 97%, when 90-day IPR (internal pressure retention) was measured under 21° C. and 101.3 kPa condition according to ASTM F1112-06, and thus may prevent an overturning accident of an automobile and degradation of mileage caused by low internal pressure.

To the contrary, in the case of the tire inner liner film of Comparative Example 1, due to a high modulus and low deformability, a tire could not be formed, and a film was not deformed during green tire manufacture thus generating crushing of the green tire, and thus a tire could not be manufactured. In the case of Comparative Examples 2 and 3, although a tire could be formed, internal pressure retention for 90 days was remarkably lowered to 81.5 (decrease rate 18.5%) and 83% (decrease rate 17%). If internal pressure retention is remarkably lowered, problems in terms of stability such as an overturning accident of an automobile and the like due to low internal pressure of the tire, and degradation of performance such as mileage and the like may be caused.

What is claimed is:

1. A film for a tire inner liner comprising:
   a base film layer comprising a copolymer comprising a polyamide-based segment and a polyether-based segment, and a polyamide-based resin; and
   an adhesive layer formed on at least one side of the base film layer and comprising a resorcinol-formalin-latex (RFL)-based adhesive,
   wherein a tensile recovery rate of the base film layer according to the following Formula 1 is 30% to 80%:

Tensile Recovery Rate(%)=$(L_1-L_2)*100/(L_1-L_0)$ [Formula 1]

in Formula 1, $L_1$ denotes the length of the base film at 100% elongation at room temperature, $L_2$ denotes the final length of the base film when the base film is shrunken after 100% elongation at room temperature, and $L_0$ denotes the length of the original sample before elongation.

2. The film for a tire inner liner according to claim 1, wherein the polyamide-based segment of the copolymer comprises a repeating unit of the following Chemical Formula 1 or Chemical Formula 2:

[Chemical Formula 1]

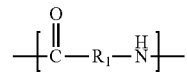

in Chemical Formula 1, $R_1$ is a C1-20 liner or branched alkylene group or a C7-20 liner or branched arylalkylene group,

[Chemical Formula 2]

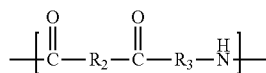

in Chemical Formula 2, $R_2$ is a C1-20 linear or branched alkylene group, and $R_3$ is a C1-20 linear or branched alkylene group or a C7-20 liner or branched arylalkylene group.

3. The film for a tire inner liner according to claim 1, wherein the polyether-based segment of the copolymer comprises a repeating unit of the following Chemical Formula 3:

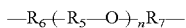 [Chemical Formula 3]

in Chemical Formula 3, $R_5$ is a C1-10 linear or branched alkylene group, n is an integer of from 1 to 100, and $R_6$ and $R_7$ may be identical or different, and are independently a direct bond, —O—, —NH—, —COO—, or —CONH—.

4. The film for a tire inner liner according to claim 1, wherein the base film layer has a thickness of 30 to 300 μm, and the adhesive layer has a thickness of 0.1 to 20 μm.

5. The film for a tire inner liner according to claim 1, wherein the base film layer is an unstretched film.

6. The film for a tire inner liner according to claim 1, wherein the resorcinol-formalin-latex (RFL)-based adhesive comprises 2 to 30 wt % of a condensate of resorcinol and formaldehyde, and 68 to 98 wt % of latex.

7. A method for preparing the film for a tire inner liner according to claim 1 comprising:

mixing a copolymer comprising a polyamide-based segment and a polyether-based segment, and a polyamide-based resin, and melting and extruding the mixture at a temperature in the range of 230 to 300° C. to form a base film layer; and forming an adhesive layer comprising a resorcinol-formalin-latex (RFL)-based adhesive on at least one side of the base film layer.

8. The method according to claim 7, wherein the step of forming the base film layer comprises extruding the mixture to a film with a thickness of 30 to 300 μm.

9. The method according to claim 7, wherein the step of forming the adhesive layer comprises coating an adhesive comprising 2 to 30 wt % of a condensate of resorcinol and formaldehyde, and 68 to 98 wt % of latex, on at least one side of the base film layer to a thickness of 0.1 to 20 μm.

* * * * *